UNITED STATES PATENT OFFICE.

FREDERICK M. RUSCHHAUPT, OF NEW YORK, N. Y.

IMPROVEMENT IN ADAPTATION OF SUBSTANCES AS MOTIVE POWER.

Specification forming part of Letters Patent No. 27,569, dated March 20, 1860.

*To all whom it may concern:*

Be it known that I, FREDERICK M. RUSCHHAUPT, of the city, county, and State of New York, have invented a new and improved liquid from which to generate vapor to serve as a motive power, which I verily believe has never before been used; and I do hereby declare that the following is a true and accurate description, to wit:

This liquid is made in accordance with the law of chemical affinity. I denominate the same "carbosulphethal;" and it consists in the chemical union of bisulphuret of carbon and ethal.

The object of my invention is to produce a liquid which forms a gas of great elastic force and that is easily condensed, and which does not act injuriously upon the vessel containing the same or on the engine in which it operates, but really becomes a lubricator to all the working parts with which it comes in contact. The bisulphuret of carbon has been used alone as a motive power, and is found to be a powerful agent; but after a short time it injures and roughens the metal so as to produce great friction in the engine and working parts. This bisulphuret of carbon has also been used mixed with oil, this addition being intended to prevent friction; but experience has shown that this success was only partial, since there being no combination, but a mixture only, the oil does not volatilize with the bisulphuret of carbon, but remains as residuum in the boiler, acquiring in time a balsamic sulphurous character, the product of a partial decomposition of bisulphuret of carbon. The same is found to be the case with all fatty substances when mixed with this material. This bisulphuret of carbon has been used in connection with steam; but experiments have confirmed the published statements that it is rapidly decomposed in close vessels with steam of water. (See Gmelin Hand-Book of Chemistry, v. 1, p. 324, edt. 1827, and cited by Cayniard de Latour.)

My new liquid—carbosulphethal—is not liable to decomposition, because the two substances form a chemical combination, and being of a fatty nature, the whole operates as a lubricator. The new combination is also more readily condensed than is the bisulphuret of carbon when used alone.

To enable others to make and use my said liquid, I will proceed to described the *modus operandi.*

Coarsely-powdered potassa is added to fused spermaceti with constant stirring, and afterward, when the mass has become solid, it is first treated with water, then with muriatic acid; and the oily stratum floating on the liquid is again treated with potassa, water, and boiling acid. The mixture of ethal and cetylic acid is digested with milk of lime and ethal separated from the cetylate of lime by cold alcohol. In order to form carbosulphethal it is only necessary to mix bisulphuret of carbon and ethal in the proportion of about one part of ethal to thirty of bisulphuret of carbon, or in their chemical proportion according to the law of equivalent, and distill it over.

The ethal, in combining with the bisulphuret of carbon and forming a chemical union, causes carbosulphethal to evaporate without decomposition, and it will be evident that the ethal or other fatty matter may be prepared in any suitable manner, so long as the chemical union takes place in such a manner that there will be no separation when evaporated.

Having thus fully described my invention, I wish it distinctly understood that I do not claim the bisulphuret of carbon, nor a mixture of that substance with oil or any fatty matter forming a mere mechanical mixture; but

What I claim, and desire to secure by Letters Patent, is—

The application of vapor from the liquid herein set forth as a motor or propelling agent in engines, as specified.

In witness whereof I have hereunto set my signature this 23d day of February, 1860.

FR. M. RUSCHHAUPT.

Witnesses:
 LEMUEL W. SERRELL,
 CHAS. H. SMITH.